(12) United States Patent
Beaujot (10) Patent No.: US 10,752,149 B2
(45) Date of Patent: Aug. 25, 2020

(54) AGRICULTURAL IMPLEMENT AND RAMP ATTACHMENT SYSTEM

(71) Applicant: DOT Technology Corp., Emerald Park (CA)

(72) Inventor: Norbert Beaujot, Emerald Park (CA)

(73) Assignee: DOT Technology Corp., Emerald Park (CA)

(*) Notice: Subject to any disclaimer, the term of this patent is extended or adjusted under 35 U.S.C. 154(b) by 0 days.

(21) Appl. No.: 16/381,201

(22) Filed: Apr. 11, 2019

(65) Prior Publication Data

US 2019/0232852 A1 Aug. 1, 2019

Related U.S. Application Data

(62) Division of application No. 15/490,027, filed on Apr. 18, 2017, now abandoned.

(30) Foreign Application Priority Data

Apr. 19, 2016 (CA) .................................. 2927582
Jan. 23, 2017 (CA) .................................. 2955638

(51) Int. Cl.
*B60P 1/64* (2006.01)
*A01B 76/00* (2006.01)
(Continued)

(52) U.S. Cl.
CPC ............ *B60P 1/6481* (2013.01); *A01B 73/00* (2013.01); *A01B 76/00* (2013.01); *B65G 41/005* (2013.01);
(Continued)

(58) Field of Classification Search
CPC ....... A01B 73/00; A01B 76/00; B60P 1/6481; B65G 41/005; B65G 41/008; B65G 65/42; B65G 65/425
See application file for complete search history.

(56) References Cited

U.S. PATENT DOCUMENTS 3,462,199 A 8/1969 Downing
4,036,377 A * 7/1977 Weber ....................... B60P 1/02
414/495

(Continued)

FOREIGN PATENT DOCUMENTS

CA 2921130 9/2016
CA 2927582 10/2017
(Continued)

OTHER PUBLICATIONS

U.S. Appl. No. 15/490,027, filed Apr. 18, 2017; Beaujot.
(Continued)

*Primary Examiner* — Kaitlin S Joerger
(74) *Attorney, Agent, or Firm* — Schwegman Lundberg & Woessner, P.A.

(57) ABSTRACT

An agricultural implement for mounting on a U-shaped foundation frame supported on wheels for travel over a ground surface where the foundation frame includes first and second laterally spaced mounting beams fixed to and extending from a base. The implement is configured to perform an agricultural operation, to rest on the ground surface when in an idle position, and to attach to the foundation frame when in an operating position. The implement comprises a rigid implement portion configured to be attached to the first and second mounting beams at first and second beam locations remote from the base such that the first and second mounting beams are prevented from moving laterally with respect to each other.

28 Claims, 7 Drawing Sheets

(51) Int. Cl.
*A01B 73/00* (2006.01)
*B65G 41/00* (2006.01)
*B65G 65/42* (2006.01)

(52) U.S. Cl.
CPC .......... *B65G 41/008* (2013.01); *B65G 65/42* (2013.01); *B65G 65/425* (2013.01)

(56) References Cited

U.S. PATENT DOCUMENTS

| | | |
|---|---|---|
| 4,271,919 A | 6/1981 | Vaughan |
| 4,351,428 A | 9/1982 | Long |
| 4,359,117 A | 11/1982 | Vaughan |
| 4,603,775 A | 8/1986 | Plett |
| 4,714,149 A | 1/1987 | Tiede |
| 4,650,058 A | 3/1987 | Vaughan |
| 4,963,066 A | 10/1990 | Boppart |
| 5,318,444 A | 6/1994 | Kuzub |
| 7,191,889 B1 | 3/2007 | Heley |
| 7,488,149 B2 | 2/2009 | Waldner |
| 7,708,131 B2 | 5/2010 | Muth |
| 7,793,770 B1 | 9/2010 | Schoonover |
| 7,866,456 B2 * | 1/2011 | Bauman ............... B65G 33/00 198/311 |
| 8,118,151 B1 | 2/2012 | Jesse |
| 8,180,534 B2 | 5/2012 | Burke |
| 8,272,493 B1 | 9/2012 | Grengs |
| 8,365,896 B2 * | 2/2013 | Jesse ............... B65G 33/14 180/16 |
| 8,396,632 B2 | 3/2013 | Burke |
| 8,584,827 B1 | 11/2013 | Jesse |
| 9,145,264 B2 * | 9/2015 | Houssian ............. B65G 41/008 |
| 9,855,876 B2 | 1/2018 | Affleck |
| 9,932,178 B2 * | 4/2018 | Allensworth ......... B65G 41/002 |
| 10,407,248 B2 * | 9/2019 | Rempel ............... B65G 15/08 |
| 10,550,694 B2 * | 2/2020 | Watson .................. E21F 13/02 |
| 10,556,751 B2 * | 2/2020 | Peutert ................ B60B 33/006 |
| 2014/0048381 A1 * | 2/2014 | Smith ................ B65G 41/002 198/302 |
| 2015/0237803 A1 * | 8/2015 | Hilvers ................ B65G 41/008 414/332 |
| 2016/0244268 A1 * | 8/2016 | Ritter .................. B65G 41/002 |
| 2017/0297471 A1 * | 10/2017 | Beaujot ................ A01B 76/00 |
| 2019/0053417 A1 * | 2/2019 | Beaujot ............. A01B 63/1006 |
| 2019/0210807 A1 * | 7/2019 | Kornelsen ............. B65G 15/12 |
| 2019/0308830 A1 * | 10/2019 | Quist .................. B65G 41/008 |

FOREIGN PATENT DOCUMENTS

| | | | |
|---|---|---|---|
| CA | 2964610 | 10/2017 | |
| CA | 2964610 A1 * | 10/2017 | ........... B60P 1/6481 |
| CA | 2955638 | 7/2018 | |

OTHER PUBLICATIONS

"U.S. Appl. No. 15/490,027, Restriction Requirement dated Apr. 5, 2018", 6 pgs.

"U.S. Appl. No. 15/490,027, Response filed Jun. 4, 2018 to Restriction Requirement dated Apr. 5, 2018", 1 pg.

"U.S. Appl. No. 15/490,027, Non Final Office Action dated Aug. 9, 2018", 8 pgs.

"U.S. Appl. No. 15/490,027, Response filed Nov. 9, 2018 to Non Final Office Action dated Aug. 9, 2018", 6 pgs.

"U.S. Appl. No. 15/490,027, Final Office Action dated Jan. 14, 2019", 8 pgs.

* cited by examiner

AGRICULTURAL IMPLEMENT AND RAMP ATTACHMENT SYSTEM

CROSS-REFERENCE TO RELATED APPLICATIONS

This application is a divisional of application Ser. No. 15/490,027 filed Apr. 18, 2017, which claims priority on CA 2,927,582 filed Apr. 19, 2016 and CA 2,955,638, filed Jan. 23, 2017, the entire disclosures of which are all hereby incorporated herein by reference in this application in their entireties.

This disclosure relates to the field of agricultural implements and in particular an implement configured to perform a wide variety of agricultural operations and to be attached to a foundation frame supported on wheels.

BACKGROUND

Implements such as are used in agriculture and various industries such as road construction and maintenance include a wide variety of sizes and configurations. Implements such as combines, swathers, sprayers, road graders, earth movers, and the like are commonly self-propelled, with the engine, drive system, and operators station incorporated into the implement itself. Implements such as air seeders, cultivators, discs, grain carts, mowers, and the like are more commonly towed behind a tractor. Some implements are configured to be mounted directly on a tractor instead of being towed behind, such as snowplows mounted on the front end of a tractor, mowers mounted under a middle portion of the tractor, and a wide variety of implements mounted to the arms of a three point hitch system commonly incorporated on the rear end of tractors.

Canadian Patent Application Number 2,921,130 of the present inventor Beaujot discloses an implement operating apparatus comprising a drive frame supported on drive wheels for travel on a ground surface. A motor is mounted on the drive frame and rotates the drive wheels as well as providing power for controls and various implements that are attached to the drive frame. The drive frame includes a base beam and right and left substantially parallel side mounting beams extending from corresponding right and left ends of the base beam.

SUMMARY OF THE INVENTION

The present disclosure provides an agricultural implement apparatus that overcomes problems in the prior art.

In a first embodiment the present disclosure provides an agricultural implement for mounting on a U-shaped foundation frame supported on wheels for travel over a ground surface where the foundation frame includes first and second laterally spaced mounting beams fixed to and extending from a base. The implement is configured to perform an agricultural operation, to rest on the ground surface when in an idle position, and to attach to the foundation frame when in an operating position. The implement comprises a rigid implement portion configured to be attached to the first and second mounting beams at first and second beam locations remote from the base such that the first and second mounting beams are prevented from moving laterally with respect to each other.

In a second embodiment the present disclosure provides an agricultural implement apparatus for mounting on a U-shaped foundation frame supported on wheels for travel over a ground surface where the foundation frame includes a base beam and first and second substantially parallel and laterally spaced mounting beams fixed to and extending in a like direction from corresponding first and second ends of the base beam. The apparatus comprises an operating implement configured to perform an agricultural operation and including a rigid structural member. A support assembly is configured to support the operating implement in an idle position on the ground surface. The rigid structural member is configured to be attached to the first and second side beams at corresponding first and second beam locations remote from the base beam such that the first and second mounting beams are substantially prevented from moving laterally with respect to each other.

In a third embodiment the present disclosure provides an implement operating system comprising a foundation frame; a plurality of wheels supporting the foundation frame for travel on a ground surface; an implement configured to rest on the ground surface when in an idle position; a ramp member attached to one of the foundation frame and the implement, the ramp member including an upward sloping bearing surface; and a support member attached to the other of the foundation frame and the implement. The implement and the foundation frame are configured such that when the foundation frame is maneuvered to an implement loading position with respect to the implement in the idle position, the implement is connectable to the foundation frame and movable to an operating position supported by the foundation frame where the selected implement is connectable to an implement control system operative to control implement functions, and where the steering and drive controls are operative to move and steer the foundation frame and selected implement along the travel path. When the foundation frame is in the implement loading position the support member is aligned with the ramp member and the implement is moved to the operating position by moving the foundation frame and implement toward each other such that the support member bears against the bearing surface of the ramp member and exerts an upward force on the implement and as the foundation frame and implement move toward each other the support member moves along the bearing surface of the ramp member such that the implement moves upward to the operating position.

In a fourth embodiment the present disclosure provides a system for loading granular material into a fill opening of a bin. The system comprises a conveyor mounted on wheels for movement along a ground surface, the conveyor including an upper conveyor discharge and a lower conveyor intake. A conveyor control system is operative to move and steer the conveyor and to selectively raise and lower the conveyor intake and the conveyor discharge. A location system is connected to the conveyor control system and operative to guide the conveyor to a bin loading position where the conveyor discharge is oriented to discharge into the bin fill opening and the conveyor intake is oriented to receive granular material from an incoming transport vehicle.

The disclosed implement apparatus provides structural rigidity to a foundation frame which includes mounting beams extending from a base to form a U-shape enclosing an open implement area. With no connection between the first and second mounting beams except at the base beam, there is a clear space between the mounting beams which facilitates loading of implements that extend above the mounting beams however since the mounting beams are connected to each other only at their ends fixed to the base beam, forces exerted on the opposite outer ends thereof can put severe stresses on the connection to the base beam. Attaching the rigid structural member to outer portions of the mounting beams prevents lateral movement of one beam with respect to the such that lateral forces on the outer end of one beam are resisted by both beams.

The present disclosure further provides an agricultural implement comprising corresponding beam and implement attachment mechanisms which provides a secure mounting of the implement to the foundation frame, as well as providing a rigid implement connected to each beam such that lateral movement of one mounting beam with respect to the other is prevented. The implement also provides a simple and effective implement moving mechanism to raise the implement from the idle position supported on the ground to the operating position supported on the foundation frame.

A system is also provided to move and guide a conveyor to a bin loading position where the conveyor discharge is oriented to discharge into the bin fill opening and the conveyor intake is oriented to receive granular material from an incoming transport vehicle.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-5 schematically illustrate an embodiment of an agricultural implement apparatus 1 of the present disclosure for mounting on a U-shaped foundation frame 3 supported on wheels 5 for travel over a ground surface 7. A foundation frame 3 includes first and second laterally spaced mounting beams 9A, 9B fixed to and extending from a base, illustrated here as a base beam 11, and with no connection between the first and second mounting beams 9A, 9B except at the base beam 11. The foundation frame 3 may be self-propelled to move an implement 15 over a field to perform an agricultural operation, or may simply be a foundation platform providing a wheeled support frame to which various implements can be connected.

Figure 1:
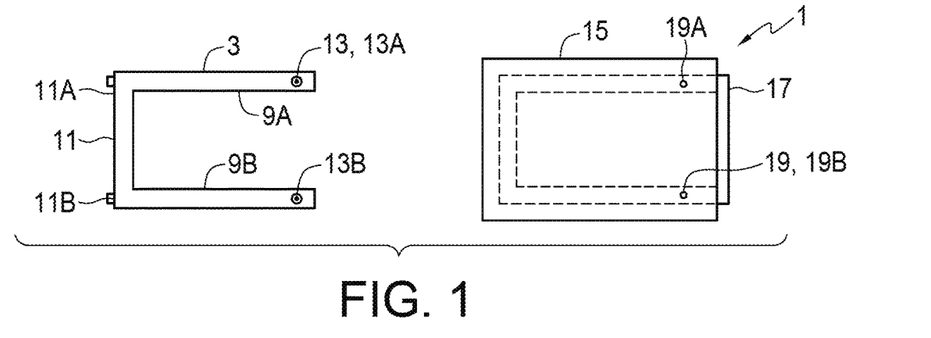
FIG. 1 is a schematic top view of a foundation frame adjacent to an embodiment of the agricultural implement apparatus of the present disclosure.
Figure 2:
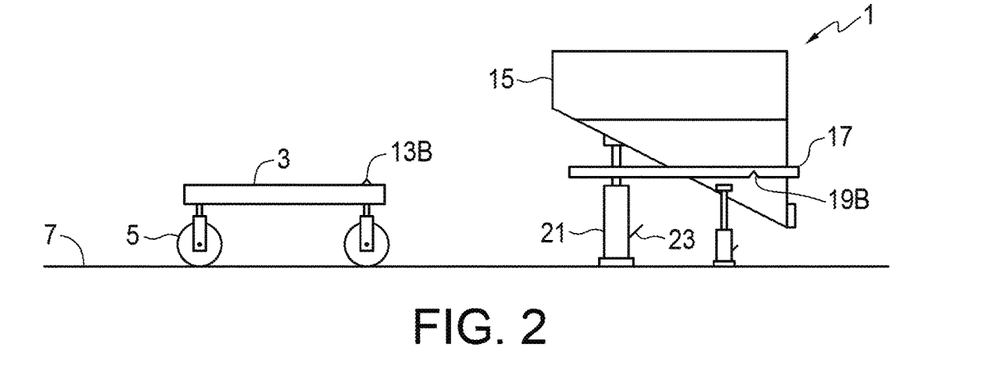
FIG. 2 is a schematic side view of the foundation frame and agricultural implement apparatus as shown in the top view of FIG. 1.

The apparatus 1 includes first and second beam attachment mechanisms 13A, 13B adapted to be mounted on the corresponding first and second mounting beams 9A, 9B at beam locations remote from the base beam 11. The various beam attachment mechanisms 13 described can be attached to the beams 9 by welding or with plates and bolts and the like suitably configured.

The apparatus 1 includes an operating implement 15 configured to perform an agricultural operation. The illustrated implement 15 is a grain tank configured to receive and dispense granular material such as harvested crops, and when mounted on the foundation frame 3, to transport the granular material.

In the illustrated apparatus 1 the first and second mounting beams 9A, 9B are laterally spaced and substantially parallel and extend in a like direction from corresponding first and second ends 11A, 11B of the base beam 11. The apparatus 1 includes a rigid implement portion that is configured to be attached to the mounting beams 9 by the beam attachment mechanisms 13 such that the first and second mounting beams 9A, 9B are prevented from moving laterally with respect to each other.

In the illustrated apparatus 1 the rigid implement portion is provided by a rigid structural member 17, here the frame forming part of the operating implement 15, that is configured to be attached to the first and second beam attachment mechanisms 13A, 13B mounted on the corresponding first and second mounting beams 9A, 9B at fixed beam locations remote from the base beam 11 such that the mounting beams 9 are substantially locked in a position that is fixed with respect to each other and with respect to the rigid structural member 17. In the illustrated apparatus 1 first and second implement attachment mechanisms 19A, 19B are mounted on the rigid structural member 19 at locations corresponding to the beam locations where the first and second beam attachment mechanisms 13, 13B have been attached.

Figure 3:
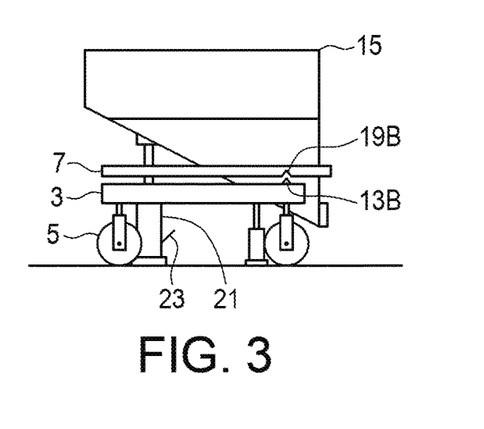
FIG. 3 is a schematic side view the foundation frame in a loading position with respect to the agricultural implement apparatus of FIG. 1, where the agricultural implement apparatus is in the idle position supported on the ground.
Figure 5:
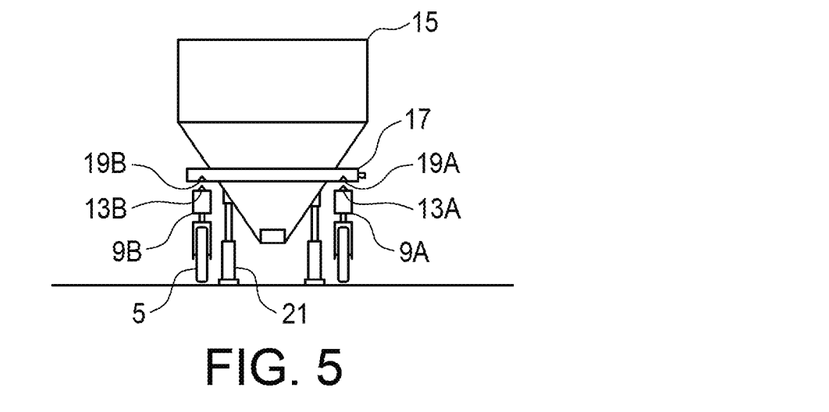
FIG. 5 is a schematic end view of the foundation frame in loading position with respect to the agricultural implement apparatus shown in FIG. 3, where the agricultural implement apparatus is in the idle position supported on the ground.

When the foundation frame 3 is in the loading position with respect to the implement 15 as schematically illustrated in FIG. 3, the first and second implement attachment mechanisms 19A, 19B are directly above the corresponding first and second beam attachment mechanisms 13A, 13B. The illustrated implement 15 is configured such that when the foundation frame 3 is in the loading position as seen in FIG. 5, the implement 15 is between and above the first and second mounting beams 9A, 9B.

The apparatus 1 includes a support assembly, illustrated as hydraulic jacks 21 configured to support the operating implement 15 in an idle position on the ground surface 7 as shown in FIGS. 1-3. The apparatus 1 further includes an implement moving mechanism operative, when the foundation frame 3 is in the loading position with respect to the implement 15 as illustrated in FIGS. 3 and 5, to move the implement 15 vertically upward or downward from the position of FIGS. 3 and 5 to the position of FIG. 4 where the weight of the implement is transferred wholly from the ground surface 7 to the foundation frame 3. In the schematically illustrated apparatus 1 the implement moving mechanism is provided by jack handles 23 that extend or retract the hydraulic jacks 21. It is contemplated that the hydraulic jacks 21 could also be connected to a hydraulic power source of the foundation frame 3 when the foundation frame 3 is in the loading position.

Figure 4:
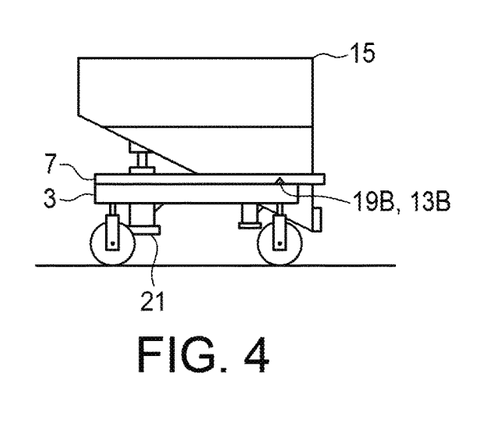
FIG. 4 is a schematic side view of the agricultural implement apparatus of FIG. 1 wholly supported on the foundation frame with the support assembly raised above the ground.

In the illustrated apparatus 1 the jack handles 23 are manipulated to move the implement 15 downward such that the first implement attachment mechanism 19A bears against the first beam attachment mechanism 13*a* and the second implement attachment mechanism 19B bears against the second beam attachment mechanism 13B as shown in FIG. 4. The jack handles 23 are manipulated such that the weight of the implement 15 is wholly transferred from the ground surface 7 to the foundation frame 3, and then further such that the hydraulic jacks 21 move off the ground surface 7 as shown in FIG. 4.

It is contemplated as well that in some configurations of the implement, the implement moving mechanism will move the implement upward so that the first implement attachment mechanism bears upward against the first beam attachment mechanism and the second implement attachment mechanism bears upward against the second beam attachment mechanism, and the two are connected together.

Figure 6:
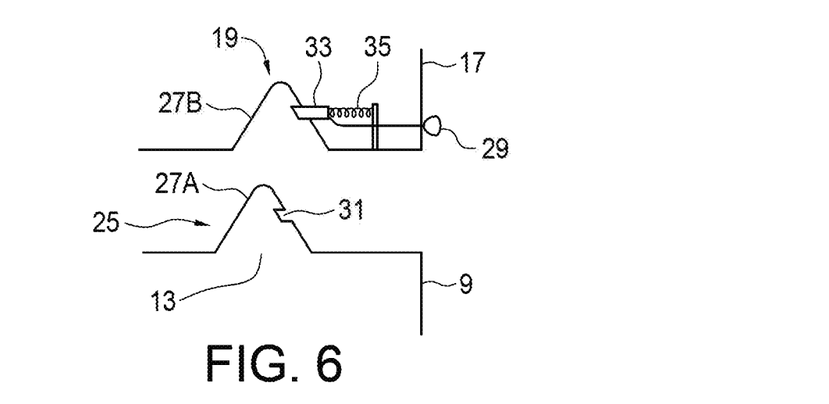
FIG. 6 is a schematic sectional view of a latch assembly which can be used to provide the beam attachment mechanisms and the implement attachment mechanisms.

In the illustrated apparatus 1 the beam attachment mechanisms 13 and the implement attachment mechanisms 19 can be conveniently provided by cooperating latch mechanisms 25 as schematically illustrated in FIG. 6. The latch mechanisms 25 are provided by conical projections 27A extending upward from the top surface of the mounting beams 9 and corresponding conical recesses 27B in the rigid structural member 17. As the rigid structural member 17 moves downward the conical projection 27A enters the conical recess 27B and further downward movement moves the conical projection 27A and recess 27B into full engagement in the correct alignment. The implement 15 is attached to the first and second mounting beams 9 when the implement attachment mechanisms 19 bear against the beam attachment mechanisms 13 to engage the latch mechanisms 25.

Correct alignment of the rigid structural member 17, and thus the implement 15, with the foundation frame 3 is facilitated since the conical projection 27A can enter an edge of the conical recess 27B and will be forced into alignment as the conical projection 27A moves fully into the conical recess 27B.

Further a lock recess 31 can be provided in the conical projection 27A configured to receive a lock member 33 that is biased by a spring 35 or the like when the conical projection 27A and recess 27B are fully engaged. A latch release 29 is mounted on the open side of the rigid structural member 17.

The illustrated latch members 25 prevent lateral movement of one beam 9 with respect to the other however up and down movement of one mounting beam 9 with respect to the other is not significantly reduced.

Figure 7:
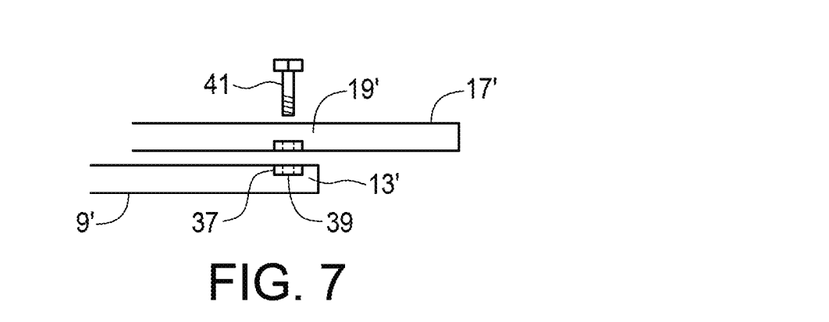
FIGS. 7 and 8 are respectively schematic side and top views of plates defining holes and connected by a bolt which can be used to provide the beam attachment mechanisms and the implement attachment mechanisms.
Figure 8:
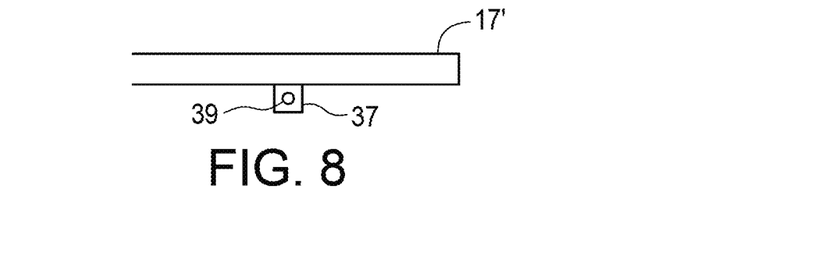

FIGS. 7 and 8 schematically illustrate an alternate arrangement wherein the beam attachment mechanisms 13' and the implement attachment mechanisms 19' comprise plates 37 attached to the rigid structural member 17' and to the mounting beams 9' and defining mounting holes 39. The implement via the rigid structural member 17' is attached to the mounting beams 9' by a bolt 41 through the holes 39 in the plates 37.

Figure 9:
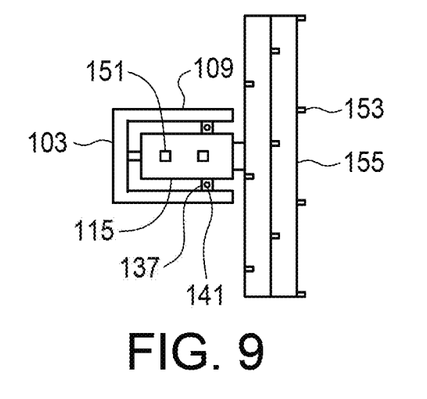
FIG. 9 is a schematic top view of the foundation frame connected to an implement configured to seed a crop.

The implement apparatus 1 can be configured to perform a variety of agricultural operations. FIG. 9 schematically illustrates an implement 115 comprising agricultural product tanks 151 mounted to the mounting beams 109 of the foundation frame 103 by plates 137 and bolts 141. Furrow openers 153 are mounted on a laterally extending implement frame 155 and the implement 115 is configured to seed a crop.

Figure 10:
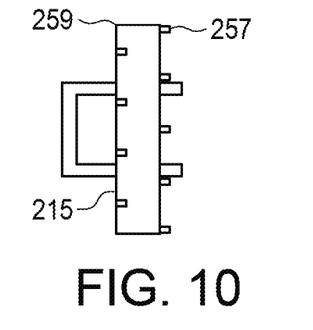
FIG. 10 is a schematic top view of the foundation frame connected to an implement configured to cultivate a field surface.

FIG. 10 schematically illustrates an implement 215 comprising cultivator shanks 257 mounted on a laterally extending implement frame 259 and configured to cultivate a field surface.

Figure 11:
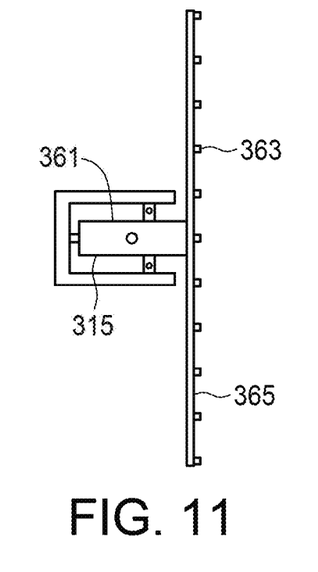
FIG. 11 is a schematic top view of the foundation frame connected to an implement configured spray liquid chemicals on a crop.

FIG. 11 schematically illustrates an implement 315 comprising a liquid tank 361 and sprayer nozzles 363 mounted on a laterally extending sprayer boom 365 and configured to spray liquid chemicals on a crop.

The disclosed implement apparatus 1 adds structural rigidity to a foundation frame which includes mounting beams 9 extending from a base, such as a base beam 11. With no connection between the first and second mounting beams 9A, 9B except at the base beam 11, there is a clear space between the mounting beams 9 which facilitates loading of implements that extend above the mounting beams 9, such as the grain tank 15 however since the mounting beams 9 are connected to each other only at their ends fixed to the base beam 11 forces exerted on the opposite outer ends thereof can put severe stresses on the connection to the base beam 11. By attaching the rigid structural member 17 to outer portions of the mounting beams 9, lateral movement of one beam with respect to the other is prevented and so lateral forces on the outer end of one beam 9 are resisted by both beams 9A. 9B.

It is contemplated that in the operations contemplated up and down movement of one mounting beam 9 with respect to the other will not subject the connection of the mounting beams 9 to the base beam to excessive forces.

FIGS. 12-16 schematically illustrate a ramp raising system installed on the foundation frame 3 and implement 67 for raising the implement 67 off the ground surface 7 and up to the operating position supported on the foundation frame 3. The raising system comprises a plurality of ramp members 69 attached to one of the foundation frame 3 and the implement 67, each ramp member 69 including a sloping bearing surface 69S, and a corresponding plurality of support members 79 attached to the other of the foundation frame 3 and the implement 67. The ramp members 69 and the support members 79 are configured such that as the implement 67 moves toward the operating position, each support member 79 bears against the sloping bearing surface 69S of the corresponding ramp member 69 and exerts an upward force on the implement 67.

FIGS. 12-16 schematically illustrate a system where the ramp members 69 are mounted on the foundation frame 3 and the support members 79 are mounted on the implement 67. In this arrangement the sloping bearing surface 69S of the ramp members 69 is the top surface. First and second ramp members 69A, 69B are attached to corresponding first and second side beams 9A, 9B. Each ramp member 69 extends substantially parallel to the corresponding side beam 9 from a base end 71 thereof that is nearest the base beam 11, to a remote end 73 thereof. Each ramp member 69 comprises a substantially horizontal flat portion 75 extending from the base end 71 thereof to a midpoint thereof, and an inclined portion 77 sloping downward from the midpoint to the remote end 73 of the ramp member 69.

The raising system further comprises first and second support members 79A, 79B attached to sides of the implement 67 and are configured to move up the sloping inclined portions 77 of the corresponding first and second ramp members 69A, 69B as the implement 67 moves toward the operating position. When the implement 67 is moved all the way to the operating position of FIG. 14 it is supported on the flat portions 75 of the ramp members when in the operating position as seen in FIG. 16.

Figures 15, 16:
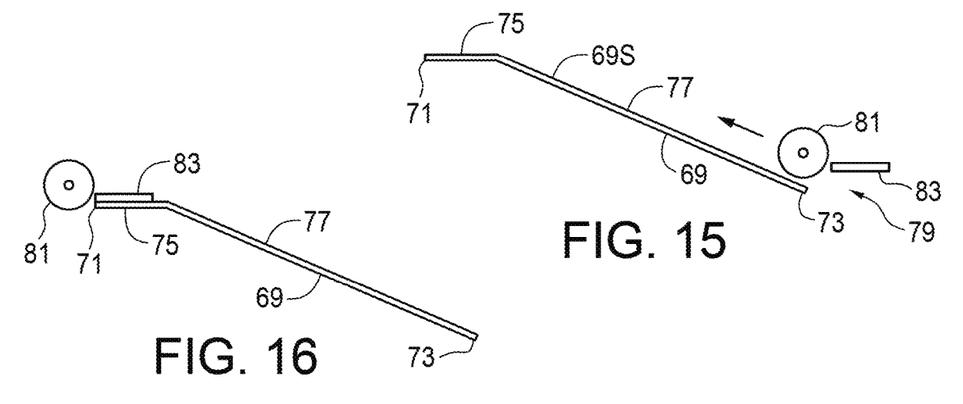
FIG. 15 is a schematic side view of a support member mounted on the implement of FIG. 12 moving up a ramp member of the ramp raising system.
FIG. 16 is a schematic side view of the support member of FIG. 15 with the implement in the operating position.

The illustrated support members 79 each comprise a support wheel 81 configured to roll along the corresponding ramp member 69, and a support surface 83 adjacent to and above a bottom edge of the support wheel 81 as schematically illustrated in FIG. 15. Thus as the support wheel 81 rolls up ramp member 69 the support surface 83 is above the ramp member 69 as seen in FIG. 15. When the implement 67 moves into the operating position of FIG. 14, each wheel 81 moves beyond the base end 71 of the corresponding ramp member 69 so that the wheel 81 no longer keeps the support surface 83 above the ramp member 69, and instead each support surface 83 rests on the corresponding flat portion 75 of each ramp member 69 supporting the implement 67 when the implement 67 is in the operating position.

Figure 17:
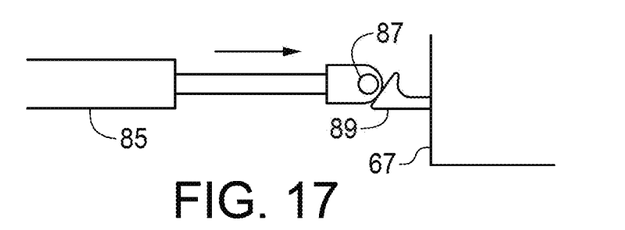
FIG. 17 is a schematic side view of the extendable connection actuator of the ramp raising system of FIG. 12 extending to engage a hook on the implement.
Figure 18:
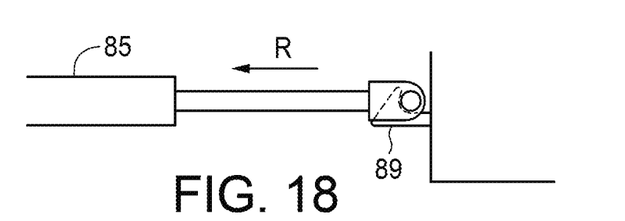
FIG. 18 is a schematic side view of the extendable connection actuator of FIG. 17 engaged with the hook on the implement.

An extendable connection actuator 85 is attached to the foundation frame 3 and is releasably attachable to the implement 67 by a pin 87 engaging a hook 89 on the implement 67. As the actuator 85 extends the pin 87 rides over the top of the hook 89 and then falls down behind the hook 89. Retracting the actuator 85, typically a hydraulic cylinder, then pulls the implement 67 toward the foundation frame 3 such that the support members 79 move up the ramp members 69 and the implement 67 moves to the operating position. Extending the actuator 85 will push the support members 79 away from the foundation frame 3 such that the support wheels 81 again roll up onto the ramp members 69 and down to move the implement 67 to the idle position. The actuator 85 can also be configured as a constantly pressurized hydraulic cylinder so that same exerts a substantially constant force on the hook 89 in the retracting direction R to keep the implement 67 in the operating position.

The implement 67 is supported in the idle position by legs 91. In the operating position the legs 91 are sufficiently far above the ground 7 that they will not interfere with implement operations. Further ramp members 69 can be attached to the foundation frame 3 at convenient locations, each with a corresponding support member 79 mounted on the implement 67. In the illustrated foundation frame 3, third and fourth ramp members 69C, 69D are attached to the base beam 11, and wherein the implement 67 comprises a corresponding third and fourth support members 79C, 79D configured to move up the inclined portion of the ramp members 69C, 69D as the implement 67 moves toward the operating position.

Figure 19:
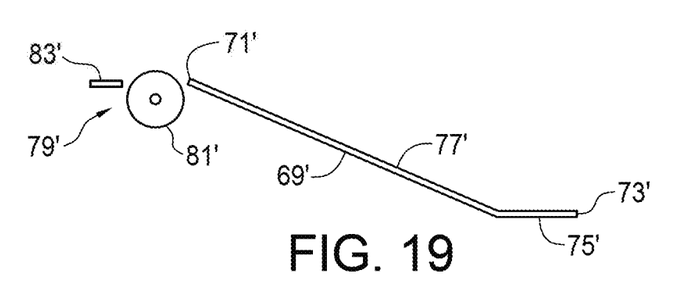
FIG. 19 is a schematic side view of a support member mounted on a foundation frame as schematically illustrated in FIG. 21 and moving up a ramp member mounted on an implement.
Figure 20:
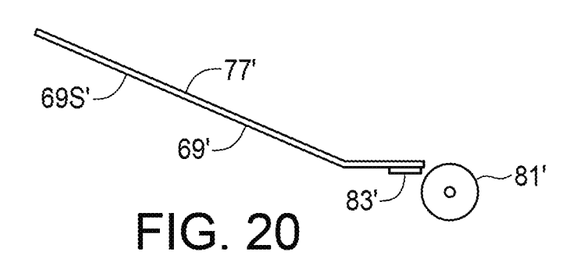
FIG. 20 is a schematic side view of the support member and ramp member of FIG. 19 when the implement is in the operating position.
Figure 21:
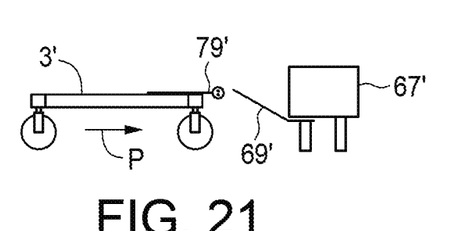
FIG. 21 is a schematic side view of a ramp raising system where a support member is mounted on the foundation frame and a corresponding ramp member is mounted on the implement.

FIGS. 19-21 schematically illustrate an alternate system where the support members 79' are mounted on the foundation frame 3' and the ramp members 69' are mounted on the implement 67'. In this arrangement the sloping bearing surface 69S' of the ramp members 69' is the bottom surface. Each ramp member 69' extends substantially parallel to the path P of the foundation frame 3' from a base end 71' thereof that is nearest the base beam 11' of the approaching foundation frame 3', to a remote end 73' thereof. Each ramp member 69' again comprises a substantially horizontal flat portion 75' extending from the remote end 73' thereof to a midpoint thereof, and an inclined portion 77' sloping upward from the midpoint to the base end 71' of the ramp member 69'.

Figure 22:
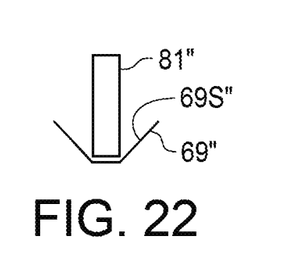
FIG. 22 is a schematic end view of a support wheel rolling along a trough shaped bearing surface of a ramp member.

Thus it can be seen that a plurality of ramp members 69, 69' and a corresponding number of support members 79, 79' can be mounted on either or both of the foundation frame 3, 3' and implement 67, 67' as required by the configuration of various implements. To facilitate proper alignment of the implement and foundation frame, FIG. 22 schematically illustrates the sloping bearing surface 69S" of the ramp member 69" formed as a trough with a flat bottom generally the same width as the width of the support wheel 81". If slightly misaligned when contacting the bearing surface 69S'', the wheel 81'' will slide to the bottom of the trough in the desired aligned position.

Figure 25:
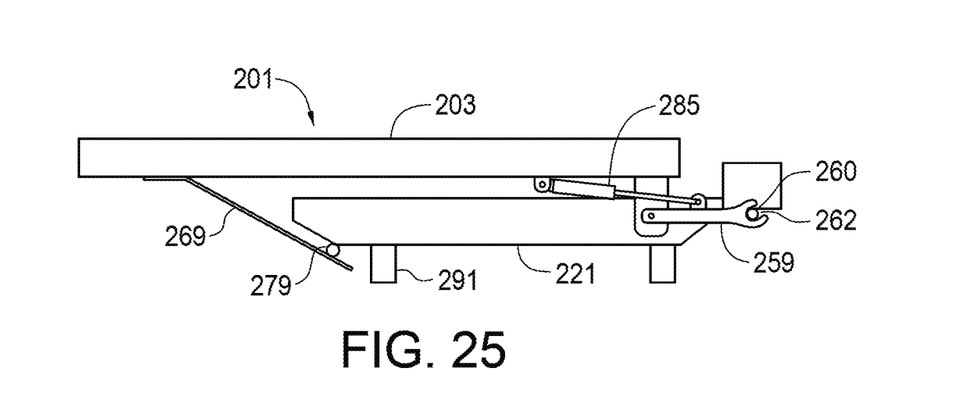
FIG. 25 is a schematic side view showing the implement in the idle position with the foundation frame in the implement loading position and using an alternate loading system where the implement is moved to the operating position supported on the foundation frame by a combination of a raising arm and ramp member.
Figure 26:
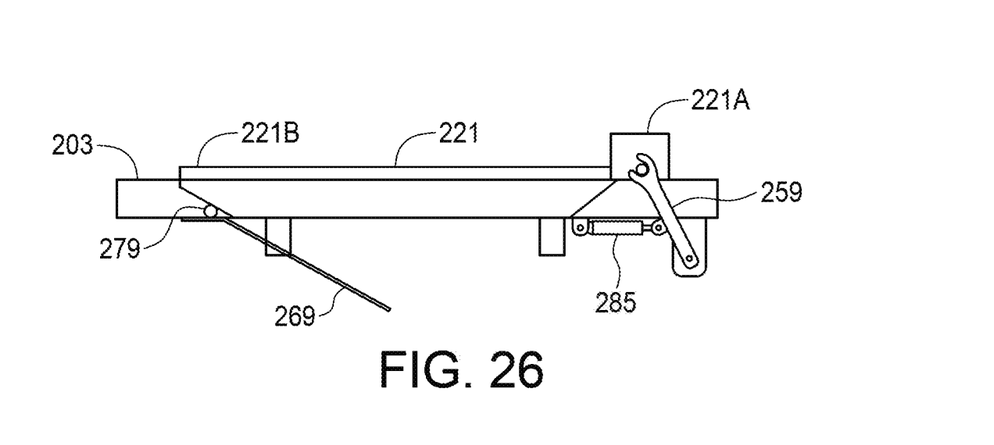
FIG. 26 is a schematic side view of the alternate loading system of FIG. 25 with the implement in the operating position supported on the foundation frame.

FIGS. 25 and 26 illustrate a system 201 using a ramp member 269 in combination with a raising arm 259 to move an implement 221 from the idle position of FIG. 25 to the operating position of FIG. 26 supported on the foundation frame 203. The support member 279 is mounted on the implement 221 and configured to engage the ramp member 269 about the same time as the pin 260 on the implement 221 engages the recess 262 in the raising arm 259. The actuator hydraulic cylinder 285 is then retracted moving the raising arm 259 and pin 260 up to move the first end 221A of the implement 221 up and toward the foundation frame 203 and also moves the support member 279 upward along the ramp member 269. Constant hydraulic pressure retracting the actuator hydraulic cylinder 285 keeps the implement in the operating position, and when it is desired to move the implement 221 off the foundation frame 203 into the idle position resting on legs 291 the actuator hydraulic cylinder 285 is simply extended.

Figure 12:
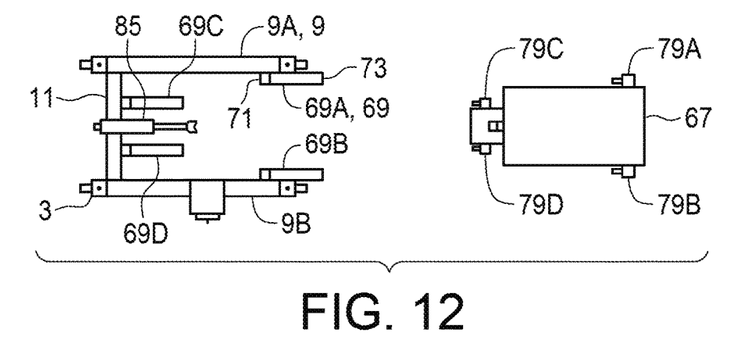
FIG. 12 is a schematic top view of the foundation frame of FIG. 1 and an implement in the idle position with a ramp raising system installed thereon.
Figure 13:
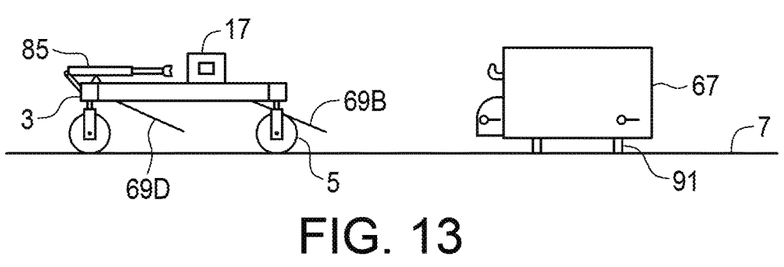
FIG. 13 is a schematic side view of the foundation frame and implement in the idle position with ramp raising system of FIG. 12.
Figure 14:
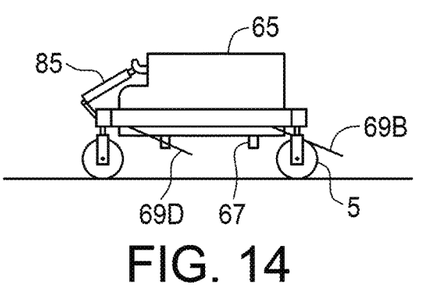
FIG. 14 is a schematic side view of the foundation frame and implement of FIG. 12 with the implement in the operating position supported on the foundation frame.

Thus the system 201 utilizes a combination of the ramp members 69 shown in FIG. 12 and a raising arm 259 with the actuator hydraulic cylinder 285 performing the function of the hydraulic connection actuator of FIGS. 12-20. Other such combinations of the described arrangements are contemplated as well.

Figure 23:
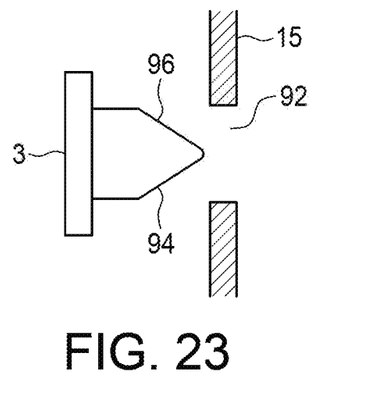
FIG. 23 is a schematic sectional side view of a guide member entering a guide aperture to align an implement and foundation frame.
Figure 24:
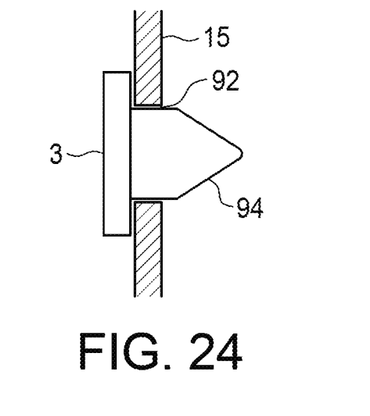
FIG. 24 is a schematic sectional side view of the guide member of FIG. 23 fully engaged in the guide aperture and substantially filling the guide aperture.

Further to facilitate alignment, FIGS. 23 and 24 schematically illustrate a guide system comprising a circular guide aperture 92 defined in the selected implement 15, and a conical guide member 94 extending from the foundation frame 3. The opposite arrangement with the circular guide aperture 92 defined in the foundation frame 3, and the conical guide member 94 extending from the selected implement 21 will function equally as well. The guide member 94 and the guide aperture 92 are configured such that as the implement moves toward the operating position as seen in FIG. 23, the guide member 94 enters the guide aperture 92, and when the implement 21 is in the operating position the guide member 94 substantially fills the guide aperture 92 as seen in FIG. 24. Thus slight misalignments are corrected when the implement achieves the operating position. The guide member 94 and guide aperture 92 can be oriented vertically or horizontally however with the guide member 94 extending horizontally as illustrated, when the guide member 94 enters the guide aperture 92, the conical edge 96 bears against the top of the guide aperture 92 and forces the implement 15 upward, such that when the implement 15 is in the operating position, the implement 15 bears downward on the guide member 94 and is supported on the foundation frame 3.

Figure 27:
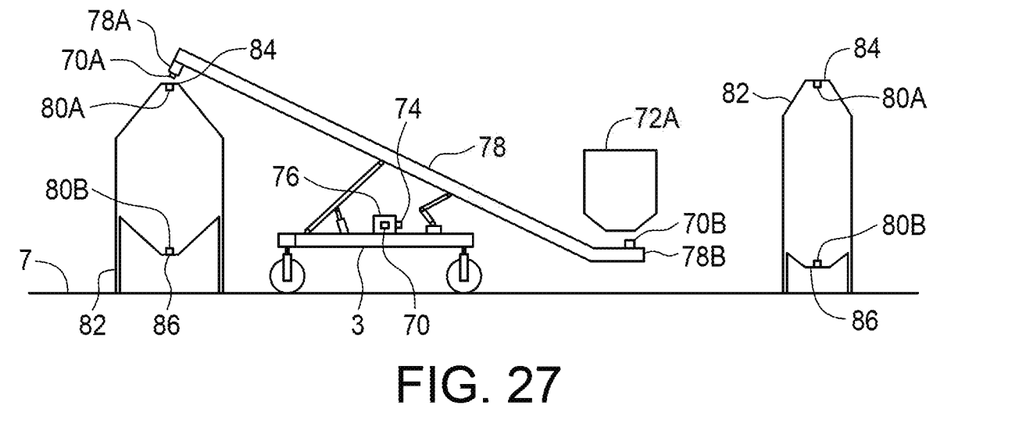
FIG. 27 is a schematic side view of a conveyor implement mounted on the drive frame with homing devices mounted on the conveyor intake and discharge and corresponding homing devices mounted on the fill and discharge openings of bins, and with a receiver to receive location signals from global positioning satellites, and with the conveyor discharge oriented to receive granular material from a transport vehicle and discharge the granular material into the bin fill opening.
Figure 28:
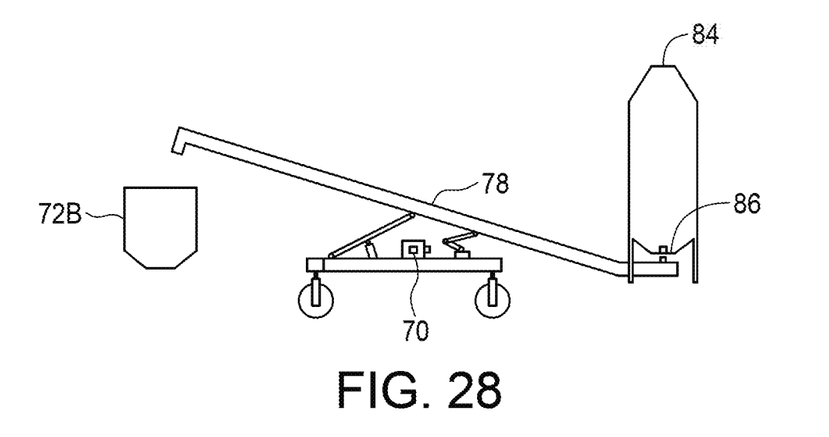
FIG. 28 is a schematic side view of the conveyor implement of FIG. 27 with the conveyor intake oriented to receive granular material from the bin discharge opening, and discharge the granular material into a transport vehicle.

A system for loading granular material into a fill opening of a bin 82 is schematically illustrated in FIGS. 27 and 28. The system comprises a conveyor 78 mounted on wheels for movement along the ground surface 7. The conveyor 78 includes an upper conveyor discharge 78A and a lower conveyor intake 78B. A conveyor control system 76 is operative to move and steer the conveyor and to selectively raise and lower the conveyor intake and the conveyor discharge. A location system 74 is connected to the conveyor control system and is operative to guide the conveyor to a bin loading position shown in FIG. 27 where the conveyor discharge 78A is oriented to discharge into the bin fill opening 84 and the conveyor intake 78B is oriented to receive granular material from an incoming transport vehicle 72A. The conveyor control system 76 could be partially manually controlled, with an operator responding to signals from the location system, or fully automated.

The illustrated location system is further operative to guide the conveyor 78 to a bin unloading position illustrated in FIG. 28 where the conveyor intake 78B is oriented to receive granular material from a bin discharge opening 86 and the conveyor discharge 78A is oriented to discharge granular material into an outgoing transport vehicle 72B.

The location system can comprise a global positioning satellite receiver 70 mounted on the conveyor 78 and operative to determine a conveyor discharge location of the conveyor discharge 78A and a conveyor intake location of the conveyor intake 78B, and wherein a bin fill location of the bin fill opening 84 and a bin discharge location of the bin discharge opening 86 are programmed into the location system.

Figure 29:
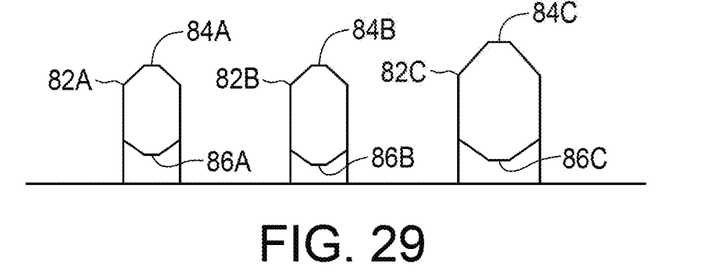
FIG. 29 is a schematic side view of a plurality of bins with homing devices mounted on the fill and discharge openings.

FIG. 29 schematically illustrates a plurality of bins 82A, 82B, 82C, where bin fill locations corresponding to bin fill openings 84A, 84B, 84C, and bin discharge locations corresponding to bin discharge openings 86A, 86B, 86C are programmed into the location system 74 and the location system is operative to guide the conveyor 78 to the bin loading and unloading positions with respect to each bin.

Alternatively as schematically illustrated in FIG. 27 the location system 74 can include a bin fill homing device 80A mounted adjacent to the bin fill opening 84 and a bin discharge homing device 80B mounted adjacent to the bin discharge opening 86. A conveyor discharge homing device 70A is mounted adjacent to the conveyor discharge 78A and a conveyor intake homing device 70B mounted adjacent to the conveyor intake 78B and the devices 70A, 70B connect through the location system 74 to the conveyor control system 76 to move and steer the conveyor 78.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural implement for mounting on a U-shaped foundation frame supported on wheels for travel over a ground surface where the foundation frame includes first and second laterally spaced mounting beams fixed to and extending from a base, wherein the implement is configured to perform an agricultural operation, to rest on the ground surface when in an idle position, and to attach to the foundation frame when in an operating position, and wherein the implement comprises a rigid implement portion configured to be attached to the first and second mounting beams at first and second beam locations remote from the base such that the first and second mounting beams are prevented from moving laterally with respect to each other.

2. The implement of claim 1 comprising first and second beam attachment mechanisms adapted to be mounted to the corresponding first and second mounting beams at the corresponding first and second beam locations, and first and second implement attachment mechanisms mounted on the rigid implement portion at locations corresponding to the first and second beam attachment mechanisms.

3. The implement of claim 2 comprising an implement support assembly configured to support the implement on the ground surface when in the idle position, and wherein the implement support assembly comprises an implement moving mechanism operative, when the foundation frame is in a loading position, to move the implement vertically such that the first implement attachment mechanism bears against the first beam attachment mechanism and the second implement attachment mechanism bears against the second beam attachment mechanism, and such that a weight of the implement is transferred from the ground surface to the foundation frame.

4. The implement of claim 3 wherein the beam attachment mechanisms and the implement attachment mechanisms comprise plates defining mounting holes, and wherein the implement is attached to the first and second mounting beams by bolts through the holes in the plates.

5. The implement of claim 3 wherein the beam attachment mechanisms and the implement attachment mechanisms comprise cooperating latch mechanisms and wherein the rigid implement portion is attached to the first and second mounting beams when the first implement attachment mechanism bears against the first beam attachment mechanism to engage a first latch mechanism and the second implement attachment mechanism bears against the second beam attachment mechanism to engage a second latch mechanism.

6. The implement of claim 3 wherein the implement moving mechanism moves the implement downward so that the first implement attachment mechanism bears downward against the first beam attachment mechanism and the second implement attachment mechanism bears downward against the second beam attachment mechanism.

7. The implement of claim 6 wherein implement moving mechanism is operative to raise the support assembly off the ground surface when the weight of the implement is wholly transferred from the ground surface to the foundation frame.

8. The implement of claim 3 configured such that when the foundation frame is in the loading position at least a portion of the implement is between and above the first and second mounting beams.

9. The implement of claim 1 wherein the agricultural operation the implement configured to perform is one of seeding a crop, cultivating a field surface, spraying liquid chemicals on a crop, and transporting harvested crop.

10. An agricultural implement apparatus for mounting on a U-shaped foundation frame supported on wheels for travel over a ground surface where the foundation frame includes a base beam and first and second substantially parallel and laterally spaced mounting beams fixed to and extending in a like direction from corresponding first and second ends of the base beam, the apparatus comprising:
 an operating implement configured to perform an agricultural operation and including a rigid structural member;
 a support assembly configured to support the operating implement in an idle position on the ground surface;
 wherein the rigid structural member is configured to be attached to the first and second side beams at corresponding first and second beam locations remote from the base beam such that the first and second mounting beams are substantially prevented from moving laterally with respect to each other.

11. The apparatus of claim 10 comprising first and second beam attachment mechanisms adapted to be mounted on the corresponding first and second mounting beams at fixed beam locations and first and second implement attachment mechanisms mounted on the rigid structural member at locations corresponding to the first and second beam attachment mechanisms.

12. The apparatus of claim 11 comprising an implement moving mechanism operative, when the foundation frame is in a loading position, to move the implement vertically from the idle position such that the first implement attachment mechanism bears against the first beam attachment mechanism and the second implement attachment mechanism bears against the second beam attachment mechanism and such that a weight of the implement is transferred from the ground surface to the foundation frame.

13. The apparatus of claim 12 wherein the beam attachment mechanisms and the implement attachment mechanisms comprise plates defining mounting holes, and wherein the implement is attached to the first and second mounting beams by bolts through the holes in the plates.

14. The apparatus of claim 12 wherein the beam attachment mechanisms and the implement attachment mechanisms comprise cooperating latch mechanisms and wherein the implement is attached to the first and second mounting beams when the first implement attachment mechanism bears against the first beam attachment mechanism to engage a first latch mechanism and the second implement attachment mechanism bears against the second beam attachment mechanism to engage a second latch mechanism.

15. The apparatus of claim 12 wherein the implement moving mechanism moves the implement downward so that the first implement attachment mechanism bears downward against the first beam attachment mechanism and the second implement attachment mechanism bears downward against the second beam attachment mechanism.

16. The apparatus of claim 15 wherein the implement moving mechanism is operative to raise the support assembly off the ground surface when the weight of the implement is wholly transferred from the ground surface to the foundation frame.

17. The apparatus of claim 10 configured such that when the foundation frame is in the loading position at least a portion of the implement is between and above the first and second mounting beams.

18. The apparatus of claim 10 wherein the agricultural operation the implement is configured to perform is one of seeding a crop, cultivating a field surface, spraying liquid chemicals on a crop, and transporting harvested crop material.

19. An implement operating system comprising:
 a foundation frame;
 a plurality of wheels supporting the foundation frame for travel on a ground surface;
 an implement configured to rest on the ground surface when in an idle position;
 a ramp member attached to one of the foundation frame and the implement, the ramp member including an upward sloping bearing surface;
 a support member attached to the other of the foundation frame and the implement;
 wherein the implement and the foundation frame are configured such that when the foundation frame is maneuvered to an implement loading position with respect to the implement in the idle position, the implement is connectable to the foundation frame and movable to an operating position supported by the foundation frame where the selected implement is connectable to an implement control system operative to control implement functions, and where the steering and drive controls are operative to move and steer the foundation frame and selected implement along the travel path;
 wherein when the foundation frame is in the implement loading position the support member is aligned with the ramp member and the implement is moved to the operating position by moving the foundation frame and implement toward each other such that the support member bears against the bearing surface of the ramp member and exerts an upward force on the implement and as the foundation frame and implement move toward each other the support member moves along the bearing surface of the ramp member such that the implement moves upward to the operating position.

20. The system of claim 19 wherein:

the ramp member is attached to the implement and comprises a substantially horizontal flat portion extending from an implement end thereof to a midpoint thereof, and an inclined portion sloping upward from the midpoint, and wherein a bottom surface of the sloping inclined portion provides the bearing surface of the ramp member;

the support member is attached to the foundation frame; and the support member bears against the bottom surface of the inclined portion of the ramp member.

21. The system of claim 20 comprising:

first and second support members attached to corresponding first and second sides of the foundation frame;

corresponding first and second parallel ramp members attached to the implement;

wherein when the foundation frame is in the implement loading position with respect to the implement, the inclined portion of each ramp member slopes upward toward the foundation frame;

wherein as the foundation frame and implement move toward each other the first and second support members bear against the bottom surfaces of the inclined portions of the corresponding first and second ramp members as the implement moves toward the operating position.

22. The system of claim 21 wherein:

the ramp member is attached to the foundation frame and comprises a substantially horizontal flat portion extending from a frame end thereof to a midpoint thereof, and an inclined portion sloping downward from the midpoint, and wherein a top surface of the sloping inclined portion provides the bearing surface of the ramp member;

the support member is attached to the implement; and the support member bears against a top surface of the inclined portion of the ramp member.

23. The system of claim 22 comprising:

first and second parallel ramp members attached to corresponding first and second sides of the foundation frame;

corresponding first and second support members attached to the implement;

wherein when the foundation frame is in the implement loading position with respect to the implement, the inclined portion of each ramp member slopes downward toward the implement;

wherein as the foundation frame and implement move toward each other the first and second support members bear against the top surfaces of the inclined portions of the corresponding first and second ramp members as the implement moves toward the operating position.

24. The system of claim 22 comprising a third ramp member attached to the foundation frame parallel to the first and second ramp members, and a corresponding third support member attached to the implement and configured to bear against the top surface of the inclined portion of the third ramp member as the implement moves toward the operating position.

25. The system of claim 20 wherein each support member comprises a support wheel configured to bear against and roll along the bearing surface of the corresponding ramp member, and a support surface adjacent to the support wheel configured such that as the support wheel rolls along the bearing surface of the corresponding ramp member the support surface is removed from the corresponding ramp member.

26. The system of claim 25 wherein as the implement moves into the operating position, each support wheel rolls onto the flat portion of the corresponding ramp member and when the implement is in the operating position, each support wheel is beyond the flat portion of the corresponding ramp member, and each support surface bears against the flat portion of the corresponding ramp member to support the implement in the operating position.

27. The system of claim 19 comprising an extendable connection actuator attached to the foundation frame and releasably attachable to the selected implement and operative to exert a force on the foundation frame and selected implement to move the selected implement to the operating position.

28. The system of claim 19 comprising a circular guide aperture defined in one of the foundation frame and the selected implement, and a conical guide member extending from the other of the foundation frame and the selected implement, wherein the guide member and the guide aperture are configured such that as the selected implement moves toward the operating position, the guide member enters the guide aperture, and when the selected implement is in the operating position the guide member substantially fills the guide aperture.

* * * * *